Sept. 15, 1942.	C. H. KING	2,296,038
BATTERY COVER
Original Filed Nov. 22, 1937

INVENTOR
CARL H. KING
BY John W. Michael
ATTORNEY

Patented Sept. 15, 1942

2,296,038

UNITED STATES PATENT OFFICE 2,296,038

BATTERY COVER

Carl H. King, Milwaukee, Wis., assignor to Globe-Union Inc., Milwaukee, Wis., a corporation of Delaware Original application November 22, 1937, Serial No. 175,870, now Patent No. 2,222,412, dated November 19, 1940. Divided and this application November 10, 1939, Serial No. 303,787

1 Claim. (Cl. 136—170)

This invention relates in general to storage batteries, and more particularly to an improvement in storage battery covers, especially designed to be adapted for use with batteries employed for automotive vehicles. The present application is a division of the application of Carl H. King, applicant herein, for "Battery," filed November 22, 1937, Serial No. 175,870, issued November 19, 1940, as Patent No. 2,222,412.

One of the principal objects of the present invention is to provide a single, one-piece cover for a multiple cell storage battery with the cover so constituted as to be maintained clean and dry thereby to eliminate or minimize electrical leakage.

Another object of the invention is to provide a one-piece cover of this character which may be used with facility and advantage on the conventional battery case or housing and with the conventional seal, and all of this within the same space limitations as standard batteries with single or individual cell covers.

Another important object of the invention is to provide a battery cover having these advantages and capacities, and further characterized by the provision of depressed areas in the region of the positive and negative terminal posts of the battery to accommodate and protect as well as facilitate the application and removal of the connectors between the terminal posts and the leads therefrom. In this way, the distance between the top of each terminal post and the bottom of the battery is maintained the same as in a standard battery without sacrificing plate height, and thereby reducing the capacity of the battery and while preserving the desirable sediment space below and acid space above the plates.

A storage battery in which these features and advantages are embodied is particularly well adapted for use in a modern automobile wherein the available space is so limited as to make it highly important to have each item of the equipment constructed and organized as closely and compactly as it may be.

Another object of the invention is to provide a storage battery cover of this character and having these advantages, and which is simple in construction, attractive in appearance, reliable, efficient and durable in use, and adapted to be manufactured and installed with economy and facility.

Other objects and advantages reside in certain novel features of the construction, arrangement, and combination of parts which will be hereinafter more fully described and particularly pointed out in the appended claim, reference being had to the accompanying drawing forming a part of this specification, and in which:

Figure 1:
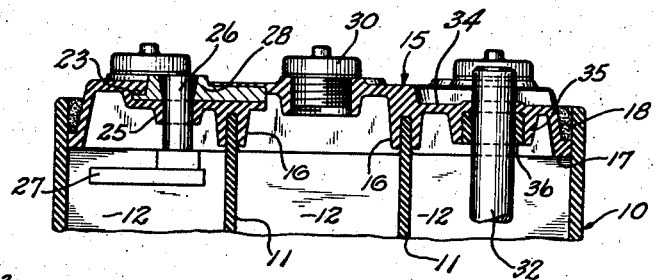
Figure 1 is a fragmentary view in transverse vertical cross section taken on line 1—1 of Figure 2, with parts shown in elevation for the sake of illustration.
Figure 2:
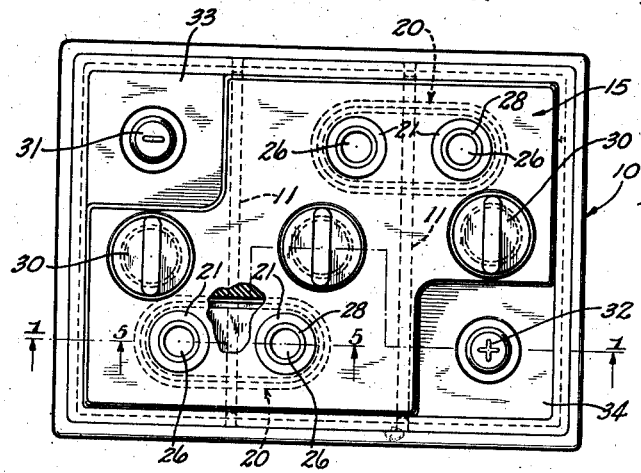
Figure 2 is a view in top plan of the battery cover shown in Figure 1, a part of the cover being broken away and shown in section for the sake of illustration.
Figure 4:
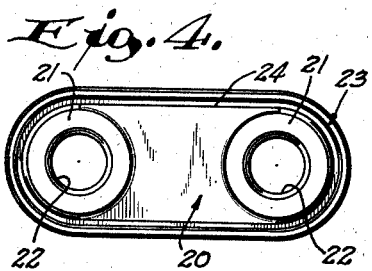
Figure 4 is a detail view in top plan showing one of the cell connectors.

Referring to the drawing, the numeral 10 designates generally the case of the battery which may be and preferably is of conventional or standard construction, and which is shown as being provided with internal partitions 11 which divide the interior of the case up into a plurality of cell-forming compartments 12. The compartments 12 are designed to receive the plates and the electrolyte (not shown) which constitute the usual elements of the battery.

Figure 3:
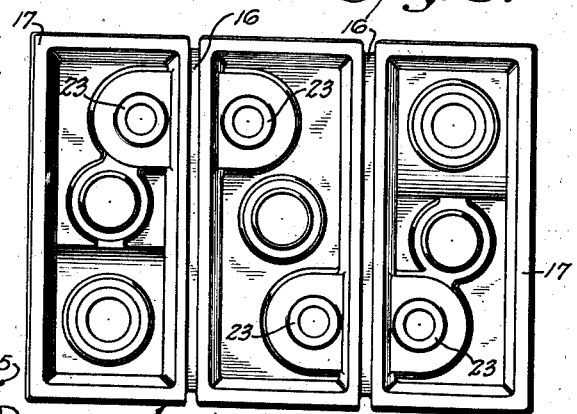
Figure 3 is a view in bottom plan of the cover shown in Figures 1 and 2.

A one piece, pre-molded cover 15 is provided and is preferably molded from hard rubber or other suitable composition in the form of an inverted pan or tray, and is also formed on its underside with transverse channels 16 which fit over the upper edges of the partitions 11. Around its lower marginal edge the cover is provided with integral outwardly directed horizontal flanges 17 which may be made as continuations of the structure which provides the channels 16 (see Figure 3). The cover 15 is dimensioned and proportioned to set down into and fit within the upper open end of the battery case, and when the cover is set in position in the case its outer peripheral portions and the flanges 17 provide a trough-like space for the reception of sealing compound 18. By so constituting the cover 15 it is adapted for use with a standard case, and as described may have the conventional seal, and all of this within the same space limitations as standard batteries with single or individual cell covers.

When the cover 15 is being molded, cell connectors, designated generally at 20, are embedded therein. Each cell connector consists of a straplike piece of lead or other suitable metal provided adjacent its ends with upwardly extending integral ring-like enlargements 21. The ring-like enlargements 21, and the underlying portions of the cell connectors on which they are formed, are provided with vertically disposed openings 22 extending through the top and bottom of the portions of the cell connectors in which they are formed. The cover and cell connectors are so dimensioned and proportioned, and are so relatively disposed, that in the assembly the cell connectors are completely housed and protected except for the top surfaces of their ring-like enlargements, which surfaces are exposed through the top of the battery cover.

The present invention proposes so to constitute the cell connectors 20 that they are positively interlocked with the material of the cover, and this in such a secure and positive manner that leakage around the cell connectors is precluded even though the battery is subjected to extreme vibration. One way of accomplishing this object is to provide each cell connector with a flange 23 extending entirely around its margin and co-acting with the adjacent portion of the cell connector to form a groove 24. When the cell connector is embedded in the battery cover a portion 15' of the material of the cover fills the groove 24 and effects the positive interlocking desired.

Figure 5:
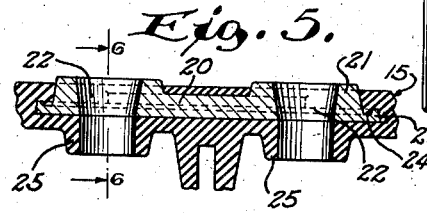
Figure 5 is a fragmentary view in vertical cross section taken on line 5—5 of Figure 2.
Figure 6:
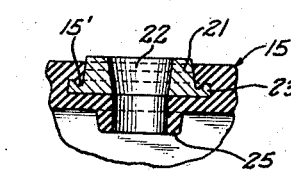
Figure 6 is a view in transverse cross section taken on line 6—6 of Figure 5.

Below each opening 22 the battery cover 15 is provided with an integral downwardly extending tubular formation 25, as clearly shown in Figures 1, 5, and 6.

When the cover 15 is assembled with the battery, the openings 22 accommodate the upper end portions of posts 26. The lower ends of these posts 26 are suitably secured to straps 27 which may be in any suitable or conventional way mechanically and electrically connected to the plates (not shown) in its cell of the battery. The upper end portions of each post 26 are burned to the ring-like enlargements 22 of its cell connector, as indicated at 28 in Figure 1. The tubular formations 25 are so dimensioned and designed that they tightly and snugly fit around the portions of the posts 26 which they receive and aid in precluding leakage past the posts.

The cover 15 is provided with a suitable number of removable filling caps designated at 30, and is also adapted to co-act with the terminals 31 and 32 of the battery.

The corners of the cover 15 are formed with depressions 33 and 34 surrounding the terminals 31 and 32 and providing the space to accommodate these terminals and connectors between them and the leads from the battery (not shown) without increasing the overall dimensions of the battery.

By virtue of the provision of the depressed areas in the cover in the region of the positive and negative terminal posts of the battery, the application and removal of the connectors (not shown) between the posts and the leads therefrom is facilitated, and when the connectors are applied they are protected. Moreover, with this construction the distance between the top of each terminal post and the bottom of the battery case may be, and in fact is, maintained the same as in a standard battery without sacrificing plate height and while preserving the desirable sediment space below and acid space above the plates.

The openings through which the terminals 31 and 32 project are provided with annular flanges 35 integral with and extending downwardly from the underside of the cover 15 and designed to receive packing sleeves 36 of rubber or other suitable material (see Figure 1).

A battery constructed in accordance with the foregoing is one of improved appearance. The cell connectors being practically completely protected will not become corroded and do not present undesirable projections. They are so combined with the cover as to prevent leakage therearound and together with the tubular formations 25 prevent leakage past the battery posts. The construction is simple, comparatively inexpensive, and may be readily produced. Furthermore, the cell connectors are so constituted and combined with the cover that they may be readily burned to the posts with which they are associated.

A cover constructed as above described may be, and in fact tends to maintain itself, clean and dry, and hence minimizes electrical leakage.

In general the construction is so compacted and so closely and advantageously organized that the battery is particularly well adapted for use with the modern automobile where the available space is so limited as to make it highly important to have every item of equipment as small and compact as possible.

While I have shown and described one construction in which the invention may be advantageously embodied, it is to be understood that the construction shown has been selected merely for the purpose of illustration or example and that various changes in the size, shape, and arrangement of the parts may be made without departing from the spirit of the invention.

I claim:

A storage battery comprising a case internally partitioned to provide a plurality of cells, a single, pre-moulded cover for said cells fitted within the upper end of said case, said cover having a diagonally extending portion raised above the top of said case, cell connectors having openings at each end embedded in said raised portion with a small portion immediately surrounding the openings therein exposed and projecting above said raised portion, plate posts having their upper end portions fitted within the openings of said connectors and burned thereto, said cover having the corners thereof opposite said raised portion depressed and substantially level with the top of said case, openings in said corners, and terminal posts projecting up through said openings.

CARL H. KING.